US012808995B2

(12) United States Patent
Becker et al.

(10) Patent No.: US 12,808,995 B2
(45) Date of Patent: Nov. 24, 2026

(54) DISTANCE SENSOR AND METHOD FOR DETECTING AN OBJECT

(71) Applicant: ams-OSRAM International GmbH, Regensburg (DE)

(72) Inventors: Dirk Becker, Langquaid (DE); Jens Richter, Hemau (DE); Sumit Adhikari, Gilching (DE)

(73) Assignee: ams-OSRAM International GmbH, Regensburg (DE)

( * ) Notice: Subject to any disclaimer, the term of this patent is extended or adjusted under 35 U.S.C. 154(b) by 242 days.

(21) Appl. No.: 18/717,951

(22) PCT Filed: Dec. 9, 2022

(86) PCT No.: PCT/EP2022/085131
§ 371 (c)(1),
(2) Date: Jun. 7, 2024

(87) PCT Pub. No.: WO2023/105034
PCT Pub. Date: Jun. 15, 2023

(65) Prior Publication Data

US 2025/0044418 A1 Feb. 6, 2025

(30) Foreign Application Priority Data

Dec. 10, 2021 (DE) ......................... 102021132716.4

(51) Int. Cl.
*G01S 7/481* (2006.01)
*G01S 17/08* (2006.01)

(52) U.S. Cl.
CPC .......... *G01S 7/4815* (2013.01); *G01S 7/4813* (2013.01); *G01S 17/08* (2013.01)

(58) Field of Classification Search
USPC ........................................................ 356/4.01
See application file for complete search history.

(56) References Cited

U.S. PATENT DOCUMENTS 4,822,170 A 4/1989 Bonnefoy et al.
8,786,847 B2 * 7/2014 Lewin ....................... G01J 1/04 356/219

(Continued)

FOREIGN PATENT DOCUMENTS

DE 102015003584 A1 9/2016
EP 2711667 A1 3/2014

OTHER PUBLICATIONS

Slawomir Piatek; "Measuring Distance with Light"; Hamamatsu Photonics website (hamamatsu.com) [full URL included in ref.]; 2015 (Year: 2015).*

(Continued)

*Primary Examiner* — Yuqing Xiao
*Assistant Examiner* — Clint Thatcher
(74) *Attorney, Agent, or Firm* — ArentFox Schiff LLP

(57) ABSTRACT

The invention relates to a distance sensor for detecting an object in a detection range of the distance sensor. The distance sensor comprises a sensor housing with a plurality of connection areas, a light emitter unit for generating light of at least a first wavelength, at least one first detector for receiving a light intensity, which is arranged at a first distance from the emitter, and at least one second detector for receiving a light intensity, which is arranged at a second distance from the emitter. In addition, an evaluation circuit is provided, which is connected to the first and second detectors and is configured to determine a distance to an object positioned in the detection range of the distance sensor from signals corresponding to the detected light intensities and the first and second distance.

19 Claims, 3 Drawing Sheets

(56) References Cited

U.S. PATENT DOCUMENTS

| | | | | |
|---|---|---|---|---|
| 12,025,702 | B2 * | 7/2024 | Droz | G01S 17/10 |
| 2010/0245289 | A1 | 9/2010 | Svajda | |
| 2013/0088576 | A1 * | 4/2013 | Hsu | H04N 13/271<br>348/46 |
| 2015/0193934 | A1 | 7/2015 | Fuchikami et al. | |
| 2017/0135617 | A1 | 5/2017 | Alasirnio et al. | |
| 2018/0375513 | A1 | 12/2018 | Li et al. | |
| 2019/0041042 | A1 * | 2/2019 | Jurkovic | G01S 17/06 |
| 2020/0149884 | A1 | 5/2020 | Nevou et al. | |
| 2020/0278194 | A1 * | 9/2020 | Kawahito | G01S 17/10 |
| 2021/0096232 | A1 * | 4/2021 | Zhou | B64D 43/00 |

OTHER PUBLICATIONS

International Search Report and Written Opinion issued in International Patent Application No. PCT/EP2022/085131 on Mar. 13, 2023.

* cited by examiner

DISTANCE SENSOR AND METHOD FOR DETECTING AN OBJECT

CROSS-REFERENCE TO RELATED APPLICATIONS

This application is a 35 U.S.C. § 371 National Phase of PCT Application No. PCT/EP2022/085131, filed on Dec. 9, 2022, which claims priority to German Patent Application No. 102021132716.4, filed on Dec. 10, 2021, the disclosures of which are hereby incorporated by reference herein in their entireties.

The present application claims the priority of the German application DE 10 2021 132 716.4 of Dec. 10, 2021, the disclosure of which is hereby incorporated by reference in its entirety.

The present invention relates to a distance sensor for detecting an object in a detection range of the distance sensor. The invention also relates to a distance sensor for detecting an object.

BACKGROUND

Distance sensors or proximity detectors are used to detect an object within a certain area and to measure its distance. These are substantially based on 2 different measurement methods to detect the distance to an object, as well as its speed and direction. One method uses the detection of a signal intensity of a signal reflected back from the object, whereby the object reflects a part of a light signal emitted by the distance sensor or proximity detector. Another method is based on a time-of-flight measurement between the emitted signal and a portion reflected back from the object. A further possibility is more passive and is based on the detection of the thermal radiation emitted by an object or the change in such radiation in a photodetector. However, simple versions of this do not allow the distance of the object to be determined. It is also conceivable to carry out a time-of-flight measurement of a modulated signal, but this places high demands on the processing electronics. A final approach would be to use stereoscopy, which in turn places high demands on image processing.

While the second method is mainly used to detect and determine the distance of objects that are at least a few meters away from the corresponding detector, the first method is mainly used to determine the distance at distances between 0 and a few meters.

Depending on the size and light intensity, it is possible to cover the medium distance range, i.e. a few meters. Smaller and significantly weaker sensors are suitable for the close range and allow distance measurements in the range from 0 mm to a few 10 cm.

Particularly with small sensors and short distances, the intensity detected and reflected back from an object is not always the same, and a corresponding curve in a photodetector often exhibits non-linear behavior. When detecting very close objects in the range of a few centimetres or even millimetres, a reflected signal first increases with increasing distance until it reaches a maximum and then falls off. This results in the problem that the same detected reflected signal intensity can possibly be assigned to 2 different positions, which means that no clear result can be assigned and ambiguity arises. FIG. 7 shows a corresponding diagram which illustrates this problem for the points P1 and P2 assumed here as examples.

At greater distances, the detected reflected signal intensity is again relatively weak and shows an essentially linear dependence on the distance with a very low gradient, so that the uncertainty for an accurate distance measurement increases significantly. In order to be able to operate proximity detectors, which work on the basis of an evaluation of the signal intensity in a larger range, a simple evaluation of the distance is only possible with a great deal of effort, which may require an iterative procedure. The computing effort for this increases significantly. An alternative is to design a corresponding detector optimized for only a partial range.

Nevertheless, there is a need to provide a distance sensor for detecting an object that has a larger operating range based on an intensity measurement of a reflected signal and detects accurately, especially at short distances.

SUMMARY OF THE INVENTION

This need is met by the objects of the independent patent claims. Further measures and advantageous embodiments are shown in the sub-claims.

In the present case, the inventors have come to the conclusion that the problems indicated at the beginning in determining the correct distance or range are primarily due to the strong nonlinearity of the detected reflected signal in the very close range and the low spatial resolution at greater distances.

These two properties, which at first glance appear to be contradictory, can be compensated for by designing the distance sensor with 2 detectors that are at different distances from a light emitter unit. A signal emitted by the light emitter unit and reflected back at the object therefore covers different distances until it hits one of the two photodetectors. As a result, for a certain distance to the object and an substantially uniform reflection of light on the object, there is a different intensity distribution between the light components detected by the detectors. From this, the distance can be determined, wherein surprisingly only the geometry of the distance sensor is included in the calculation in addition to the detected and possibly weighted light components. In contrast to conventional approaches, an iterative calculation can be dispensed with and an analytical expression can be used.

According to the proposed principle, a distance sensor for detecting an object in a detection area of the sensor comprises a sensor housing with a plurality of connection areas, a light emitter unit and at least a first and second detector. The light emitter unit is configured to generate light of at least a first wavelength. The first and second detectors are configured to receive a light component reflected by the object and to generate a signal corresponding to the received light intensity. The first detector is arranged at a first distance from the light emitter unit and the second detector is arranged at a second distance from the light emitter unit. Furthermore, an evaluation circuit is provided which is connected to the first and second detectors. This is configured to determine a distance to a detection range of the distance sensor positioned on the object from signals corresponding to the light intensities detected by the detectors and the first and second distances.

According to the proposed principle, 2 or more photodetectors are therefore used, the positions of which are significantly different in relation to a base area of an integrated circuit. This creates a different distance between the light emitter unit and the respective detector, so that different signal intensities occur when light emitted by the light emitter unit is reflected by an object. The respective signal intensities are different between the various photodetectors so that the positions of the object within the detection range of the sensor can be precisely determined over a significantly greater distance and, in particular, over very small distances.

Equivalent to this embodiment is an alternative in which 2 light emitter units and a detector are used. In this aspect, a distance sensor comprises a sensor housing with a plurality of connection areas and at least one detector for receiving a light signal and generating a signal corresponding to the light intensity. In this concept, a first light emitter unit and a second light emitter unit are provided, which are each spaced at different distances from the detector. The two light emitter units are configured to generate light of at least a first and a second wavelength respectively. The evaluation circuit is connected to the detector and the light emitter units and is configured in a similar way as before. In this context, it is expedient to provide a differentiation option for light which is emitted by the first light emitter unit or second light emitter unit. This can be, for example, a different time at which the light is emitted, a different duration at which the light is emitted or a different wavelength.

Due to this symmetry, the following aspects can be used for a combination of one light emitter unit and 2 detectors as well as for a combination of 2 light emitter units and one detector. Put simply, the positions of the light emitter unit and detectors can simply be swapped.

In one aspect, the first and second detectors are at different distances from the light emitting unit in substantially the same direction. In other words, in one aspect of the proposed principle, the first detector is located in front of the second detector as viewed from the light emitting unit. More generally, the light emitting unit and the two detectors may be in line, with the distances from the light emitting unit to the respective detectors being different. In the same way, the two lightemitting units and the one detector can also be on the same line, but at different distances.

In another aspect, a virtual line between the first detector and the light emitting unit includes an angle with a second virtual line between the first detector and the light emitting unit that is different from a multiple of 90°. Alternatively, in the same way, a virtual line between the detector and the first light emitter unit can include an angle with a second virtual line between the detector and the second light emitter unit that is different from a multiple of 90°. This inequality prevents the two detectors from being equidistant from the light emitter unit (or the two light emitter units from the detector). In some aspects, this may be the case if the angles between the two virtual lines are a multiple of 90°. In this context, it is also possible that a virtual line between the two detectors is not intersected by a perpendicular line which, on the one hand, runs through the light emitter unit and, on the other hand, forms a point of intersection with the virtual line, so that the two detectors are each equidistant from the point of intersection.

The above-mentioned positions create an arrangement between the light emitter unit and the first and second detectors or between the detector and the first and second light emitter units, which ensures a different distance between the detector(s) and the light emitter unit(s).

In a further aspect, the first detector and the second detector can lie on a virtual circle. The center of this virtual circle, however, is different with respect to the position of the light emitter unit. In the alternative embodiment, the detectors can be replaced by the light emitter units and the light emitter unit can be replaced by a detector. Consequently, the center of the virtual circle formed by the two assemblies (detectors or light emitter units) is not equal to the position of the light emitter unit or the detector.

In another aspect, it is possible that a virtual line between the first detector/light emitter unit and the light emitter unit/detector and a virtual line between the second detector/light emitter unit and the light emitter unit/detector enclose an angle of 90° when the circle formed by the two detectors/light emitter units does not come to lie with its center on the position of the light emitter unit/detector.

In another embodiment, the light emitter unit is configured to generate a first light beam and to generate a second light beam. In this embodiment, the first detector is set up to detect the first light beam and the second detector is set up to detect the second light beam. In this aspect, the first and second light beams can differ in at least one of the following properties, namely a central wavelength, a time of emission of the respective light beam and a pulse duration. Such a structure may be useful to improve the signal-to-noise ratio in some aspects.

In another aspect, the light emitter unit comprises at least a first light emitter and a second light emitter spaced apart therefrom.

To improve the signal-to-noise ratio, it may be provided in some aspects that an optical barrier is provided between the light emitting unit(s) and the first detector or the second detector. The barrier reduces crosstalk of the light emitted by the light emitter unit to the respective detectors before this light is reflected by the object located in the detection area.

Other aspects relate to the configuration and design of the evaluation circuit. In one aspect, it is conceivable that the evaluation circuit is configured to determine a dark current. Dark current is the signal that is detected by the detectors even when the light emitter unit is deactivated. The dark current can, for example, be generated by ambient light falling on the detector. When detecting the signal, this part can be deducted as it is usually constant compared to the actual measurement signal and does not change or only changes very slowly.

In another aspect, the evaluation circuit is configured to determine the distance from a sum of the distance squares such as a weighted combination of the signals corresponding to the detected light intensities in conjunction with a difference of the distance squares. This enables the evaluation circuit to determine the distance without an iterative process, but only with geometric constants specified by the distance sensor, such as the distance squares of the respective detectors to the light emitter unit and the detected and correspondingly weighted signals.

In this context, it may be provided that connection areas are arranged at least partially around the first and second detectors and the emitter. It is also possible to form the connection areas as part of an integrated circuit, in the body of which the evaluation circuit is also formed. In this way, the light emitter unit and the photodetectors can be arranged on a surface of this body to save space.

A further aspect relates to a method for determining the distance of an object. An object is irradiated with a light beam, which at least partially reflects the light beam back. In a subsequent step, a first intensity of a first light component reflected by the object is now detected. A first distance is assigned to this first light component. In a second step, which can be carried out simultaneously or subsequently, a second intensity of a second light component reflected by the object is detected. This second light component is also assigned a second distance.

In this context, the first and second intensity can originate from the same light beam with which the object was irradiated, but also from different light beams, for example at different times. It is therefore possible to irradiate the object with a first light beam and detect the first intensity and then irradiate the object with a second light beam and detect the second intensity.

The first and second distances assigned to the reflected light components are different on the one hand, and on the other hand result from a distance between a source generating the light beam and a sensor or detector detecting the respective light component. The distance can now be determined from the individual light intensities and geometric parameters. In particular, the distance to the object is determined based on a sum of the distance squares and a weighted combination of the detected intensities of the respective light components in conjunction with a difference in the distance squares.

In a further aspect, a dark current is detected when the object is not irradiated. The dark current can be caused by ambient light or thermal noise, for example. It can be taken into account when determining the distance by subtracting it from the detected intensities of the first and second light components. Similarly, in some aspects, a component resulting from crosstalk can also be compensated for. This is a signal that is detected when a light beam is generated but there is no object on which it could be reflected. Such crosstalk is also referred to as crosstalk and corresponds to the light component that enters a detector directly and without further interaction with an object.

BRIEF DESCRIPTION OF THE DRAWING

Further aspects and embodiments according to the proposed principle will become apparent with reference to the various embodiments and examples described in detail in connection with the accompanying drawings.

DETAILED DESCRIPTION

The following embodiments and examples show various aspects and their combinations according to the proposed principle. The embodiments and examples are not always to scale. Likewise, various elements may be shown enlarged or reduced in size in order to emphasize individual aspects. It is understood that the individual aspects and features of the embodiments and examples shown in the figures can be readily combined with each other without affecting the principle of the invention. Some aspects have a regular structure or shape. It should be noted that slight deviations from the ideal shape may occur in practice without, however, contradicting the inventive concept.

In addition, the individual figures, features and aspects are not necessarily shown in the correct size, and the proportions between the individual elements are not necessarily correct. Some aspects and features are emphasized by enlarging them. However, terms such as "above", "above", "below", "below", "larger", "smaller" and the like are shown correctly in relation to the elements in the figures. Thus, it is possible to derive such relationships between the elements based on the figures. However, the proposed principle is not limited to this, but various optoelectronic components with different sizes and also functionality can be used in the invention. In the embodiments, elements with the same or similar effects are shown with the same reference signs.

Referring again to FIG. 7, the diagram shows the recorded light intensity over the distance of a conventional distance sensor. The distance is divided into three ranges NR, MR and SR, with the near range NR essentially starting from 0-2 mm, the middle range MR from 2 mm to approx. 10 mm and the far range FR starting from approx. 10 mm. The diagram shown here can be scaled accordingly by a suitable design of the distance sensor.

Curve K1 as well as curve K2 show the signal curve of the light intensity recorded by a detector, which results from a light component reflected by an object. Particularly at close range, i.e. at a distance of 0 mm to 5 mm, the curves shown here exhibit a strong non-linear progression. In detail, the signal rises sharply from a specified value until it reaches a maximum, only to fall off afterwards. This drop is strongly non-linear in the medium range MR and changes to a linear drop with a very low gradient in the long range SR. Due to the strong non-linear progression, it is possible that a detected luminous intensity can be assigned not just to a single point, but to 2 different points and therefore 2 different distances. This generally leads to uncertainty or ambiguity with regard to a distance for a given and specific measurement.

Figure 7:
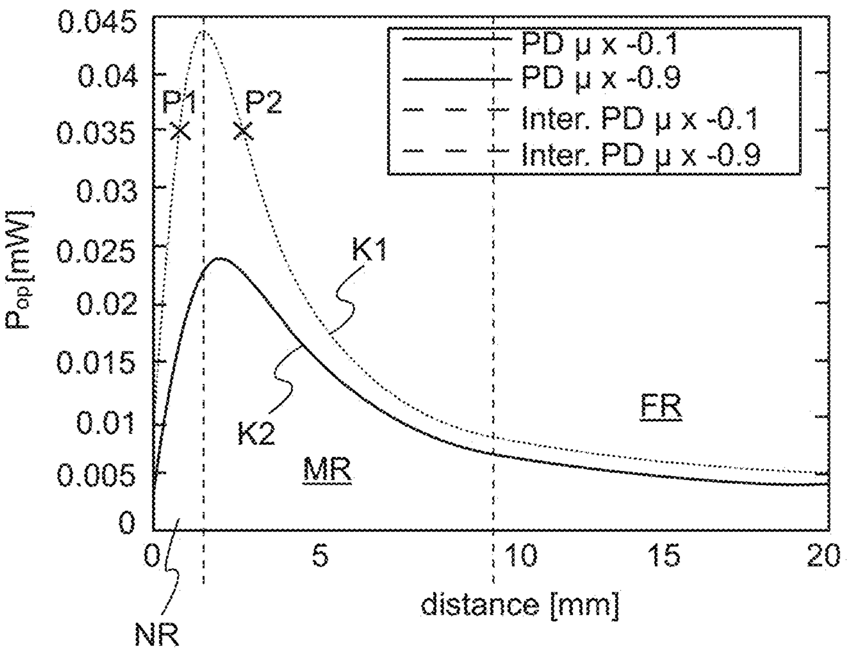
FIG. 7 shows a distance-light intensity diagram to illustrate various problems.

The problem shown in FIG. 7 is often solved conventionally by blocking out the close range NR by appropriate measures, for example by placing a disk in front of the distance sensor so that an object cannot get any closer to the sensor than the disk. However, this generally leads to an increase in the size of the sensor housing and thus to a property that runs counter to the desire for additional miniaturization.

The inventors therefore propose to provide a sensor for distance measurement that detects the luminous intensity of a light component reflected by an object not only by means of a single photodetector, but also by means of a further, at least a second, but also several photodetectors. According to the invention, this arrangement is now characterized by the fact that a distance between the respective photodetectors and an emitter unit, for example an LED, a VCSEL or a μLED, is configured differently. This distance makes it possible to decide on which side of the maximum in the curves shown in FIG. 7 the detected point and thus the distance to the object lies when measuring the light intensity in the respective photodetectors.

Figure 1:
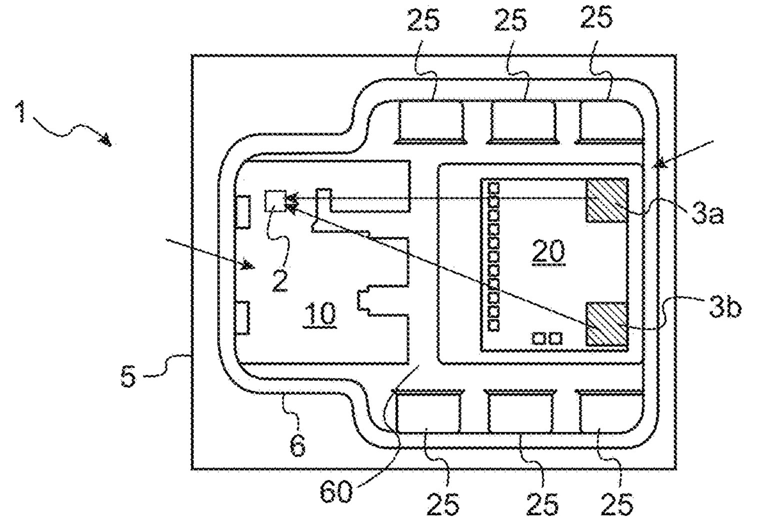
FIG. 1 shows a top view of a first embodiment of a distance sensor based on the proposed principle.

FIG. 1 shows an embodiment of such a compact distance sensor, in which both the light emitter unit and the photodetectors and an evaluation circuit are accommodated in a single housing. The embodiment shown in plan view comprises a housing 5 with an inner area 6, which is set back from a surface of the housing 5. An emitter area 10 is arranged in the inner area, to which a light emitter unit 2 is attached and electrically contacted. At a distance from this is a detector area 20, on which two photodetectors 3*a* and 3*b* are also arranged at a distance from each other. In this embodiment example, the photodetectors are arranged along a virtual line that runs parallel to the vertical edge of the housing 5. Several connection lines 25 are provided around the emitter area 10 and the detector area 20, each of which contacts the photodetectors 3*a* and 3*b* and also the light emitter unit 2 arranged on the emitter area 10. An optical barrier 60 is also provided between the emitter area 10 and the detector area 20 in order to reduce crosstalk of light from the light emitter unit 2 to the photodetectors as far as possible.

An evaluation circuit is located below the respective areas and can, for example, form a surface on which the areas 10 and 20 are implemented. The evaluation circuit is now connected on the one hand to the light emitter unit 2 and on the other hand to the photodetectors 3*a* and 3*b* and controls these accordingly. A light signal detected by the photodetectors 3*a* and 3*b* is fed to the evaluation circuit and is used to evaluate and determine the distance to an object located in front of the sensor 1.

As shown in FIG. 1, the distance between the photodetector 3*a* and the light emitter unit 2 is now different from a distance between the photodetector 3*b* and the light emitter unit 2. This results from the position shown in FIG. 1, in which the light emitter unit 2 is arranged such that a virtual line between it and the first photodetector runs substantially along a parallel edge of the housing 5. It follows that the distance between the photodetector 3*b* and the light emitter unit is greater, by an amount that is the sum of the squares of the distances between the two photodetectors and the distance between the light emitter unit 2 and the first photodetector 3*a*. In other words, the photodetector 3*b* is further away from the light emitter unit 2 than the detector 3*a*.

In one operation of the arrangement, a signal is now generated by light emitter unit 2 and the object in front of the sensor is illuminated. This reflects at least part of the light so that this reflected portion falls either into the first photodetector 3*a* or into the second photodetector 3*b*. The distance that this light beam travels from the light emitter unit 2 back to the photodetector 3*a* or 3*b* varies depending on the position of the two photodetectors. This makes it possible to determine the distance of the object by evaluating the light intensity in the two photodetectors while simultaneously taking the different lengths into account. The lengths in turn correspond to the distances between the photodetectors and the light emitter unit. It is assumed here that the object reflects evenly, which means that the two photodetectors see the same reflectivity. In a simple approximation, the measured luminous intensity as a function of the distance to an object for each photodetector is given by the formula $$f_C(z) = \frac{a_C z}{\left(\frac{d_C^2}{4} + z^2\right)^{1.5}} + b_C$$

$$f_F(z) = \frac{a_F z}{\left(\frac{d_F^2}{4} + z^2\right)^{1.5}} + b_F$$

Here, f(z) is the distance-dependent luminous intensity of the measured signal of the respective photodetector, namely fc for the closer photodetector 3*a* and $f_F$ for the somewhat more distant photodetector 3*b*. The constants a, b and d contain geometric and other parameters that depend on the respective photodetector and reflect constant system properties. The parameter z is the distance to the object.

In the case for small distances, the above conditions can only be solved iteratively if only individual photodetectors are used for this purpose. However, using two photodetectors, where the distances between the light emitter unit and the respective detector are different, results in an equation in which the two light intensity signals can be combined in a weighted manner.

$$K(z) = \frac{G_C(z)^{2/3} + \sigma G_F(z)^{2/3}}{G_C(z)^{2/3} - \sigma G_F(z)^{2/3}} \text{ with}$$

$$\sigma = \left(\frac{a_C}{a_F}\right)^{2/3}$$

G(z) is the respective signal of the photodetector corresponding to the luminous intensity of the received light component minus a component that essentially corresponds to the dark current and crosstalk. $G_c$ is again for the near detector, Gr is the value of the more distant detector.

The dark current can be determined by the evaluation circuit by evaluating the signal from the two photodetectors when the light emitter unit is not active. The proportion of crosstalk can be determined in a similar way by activating the light emitter without an object being in the detection range of the sensor. Alternatively, this proportion can also be stored in the evaluation circuit as part of a previous calibration, σ with its parameters $a_c$ and $a_F$ describes the reflectivity, i.e. geometric parameters specific to the detectors. These are also constant and are determined in a previous calibration and stored in the memory of the evaluation circuit.

The combined photo signal can now be used to determine the distance of the light-reflecting object from the photo sensor by evaluating the sum of the distance squares and the difference of the distance squares, the latter weighted with the respective combined photo signal. This results in a distance:

$$z = \sqrt{\frac{1}{2}\left\{K(z)\left(\frac{d_F^2}{4} - \frac{d_C^2}{4}\right) - \left(\frac{d_F^2}{4} + \frac{d_C^2}{4}\right)\right\}}$$

As shown here, the distance z is therefore only dependent on the weighted combination of the light intensity K (z) detected by the photodetectors and system-specific constants, in particular the distances $d_c$ and $d_F$ between the light emitter unit and the respective photodetectors. These system-specific constants can be stored in the evaluation circuit during a calibrated process of the sensor device.

To improve the results of a distance measurement, several alternative design options for the distance sensor are conceivable.

Figure 2:
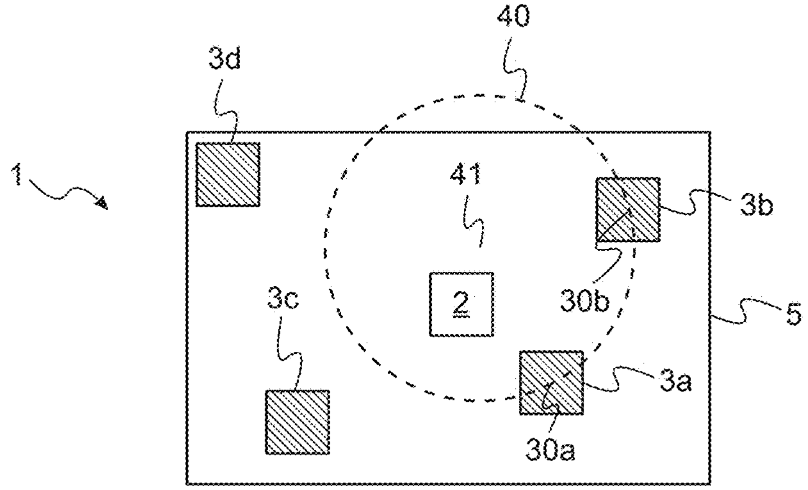
FIG. 2 shows a top view of a second embodiment of a distance sensor based on the proposed principle.

FIG. 2 shows, for example, an embodiment in which several photodetectors 3*a*, 3*b*, 3*c* and 3*d* are arranged around a light emitter unit 2. As in the previous embodiment example, the distances of the center points, for example 30*a* and 30*b*, of the photodetectors 3*a* and 3*b* from the center point of the light emitter unit 2 are at different distances. This can also be shown, for example, by drawing a virtual circle 40 through the centers of the two photodetectors, the center 41 of which does not lie on the center of light emitter unit 2.

In the example shown in FIG. 2, pairs of photodetectors can be determined whose centers are thus at different distances from the light emitter unit 2. For an evaluation, it is now possible to combine pairs of photodetectors and use their detected light intensity for the evaluation of the distance determination. For example, a first distance can be determined from the detected light intensities of the photodetectors 3*a* and 3*b*, taking into account the geometric parameters; a second distance calculation can be made, for example, by combining the detected light intensity in the photodetectors 3*c* and 3*d* and their respective geometric parameters. Both results should match.

In this way, different reflectivity of the object can also be at least partially compensated for by combining different photodetectors with each other and determining the distance based on this combination using the proposed principle. A comparison of the distances determined in this way makes it possible to achieve a higher level of confidence and thus to be able to specify the correct distance with a high degree of probability. Also, any shadowed or faulty photodetectors can no longer be used to determine the distance.

Figure 3:
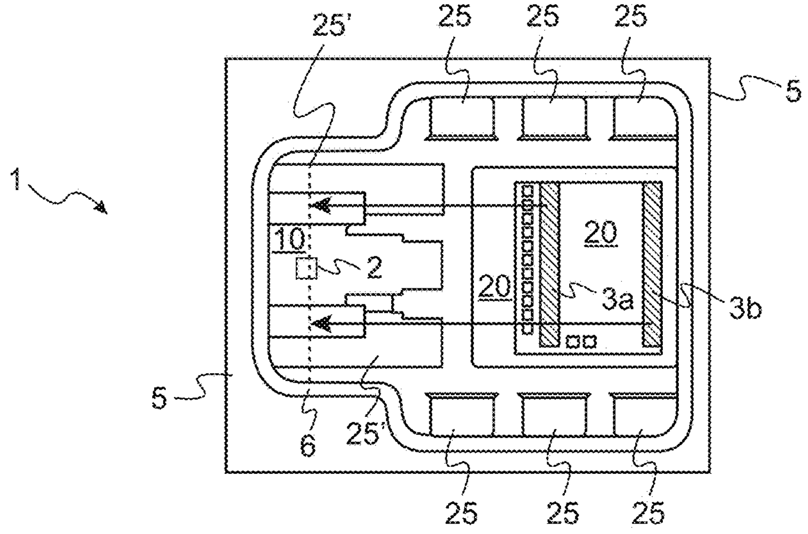
FIG. 3 shows a top view of a third embodiment of a distance sensor based on the proposed principle.

FIG. 3 shows a further embodiment of the invention with some aspects of the proposed principle. Here too, the distance sensor 1 comprises a housing with a recessed inner area, an emitter area 10 and a detector area 20 at a distance therefrom. In this embodiment, the two detectors 3*a* and 3*b* are configured as elongated photodetectors which run essentially parallel to the vertical housing wall. A light emitter unit 2 in the emitter area 10 is arranged in such a way that a virtual line parallel to the horizontal edge of the housing intersects the two photodetectors in the middle. This design nevertheless ensures that the distance of the photodetector 3*a* from the light emitter unit 2 is less than the distance of the photodetector 3*b* from the light emitter unit. In this context, the photodetector 3*b* is therefore closer to the vertical edge of the housing than the photodetector 3*a*. The emitter area 10 is surrounded by two connection areas 25', while the detector area 20 is surrounded by several connection areas 25.

In one operation of this arrangement, the evaluation circuit controls the light emitter 2 to emit a signal which is reflected by an object located in front of the sensor and reaches the two photodetectors 3*a* and 3*b*. These determine the light intensity and return a corresponding signal to the evaluation circuit, which determines a distance between the sensor and the object based on this and on the distances caused by the geometric properties of the distance sensor.

Figure 4:
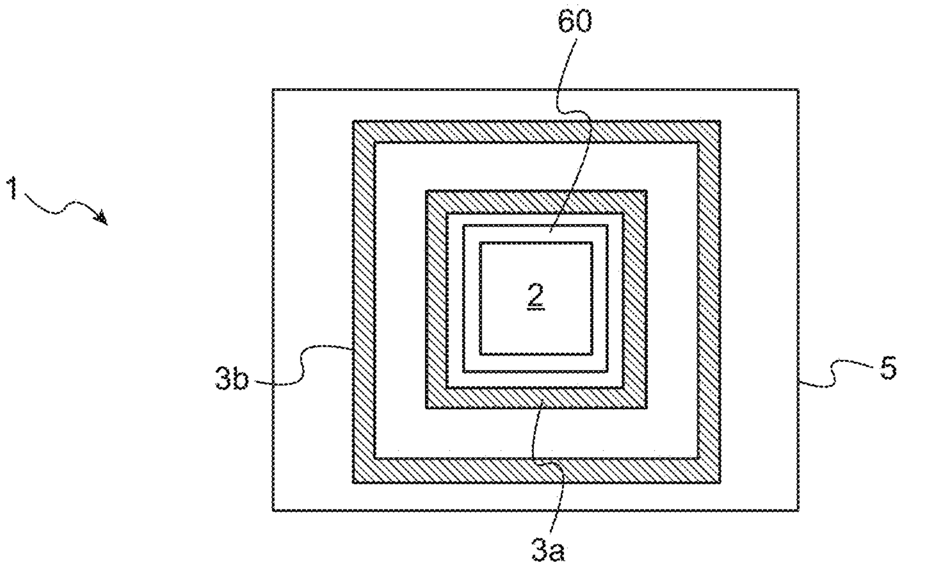
FIG. 4 shows a top view of a fourth embodiment of a distance sensor based on the proposed principle.

FIG. 4 shows another essentially symmetrical design in this context. In this rangefinder, a light emitter unit 2 is provided in a central area of the housing 5 and is surrounded by an optical barrier 60 to reduce crosstalk. A first photodetector unit 3*a* is arranged symmetrically around the light emitter unit 2. As shown in the plan view in FIG. 4, this is square in shape and thus surrounds the light emitter unit from all four sides. A second photodetector unit 3*b*, whose design is similar to the first photodetector unit 3*a*, is arranged at a greater distance from this.

This design may be advantageous if an object located in front of the sensor exhibits direction-dependent reflection behavior. The symmetrical design also ensures that as much of the light reflected by the object as possible is returned to the photodetector, where it generates a corresponding signal.

In an alternative embodiment, the respective sides of the square photodetectors 3*a* and 3*b* can also be controlled and read out individually. Similar to FIG. 2, this makes it possible to select pairs or triplets of different photodetectors and use them for distance measurement.

Due to the different distances between the light emitter unit and the photodetector, a uniform reflection of an object results in different curves with regard to the detected reflected power over the distance to the object.

Figure 6:
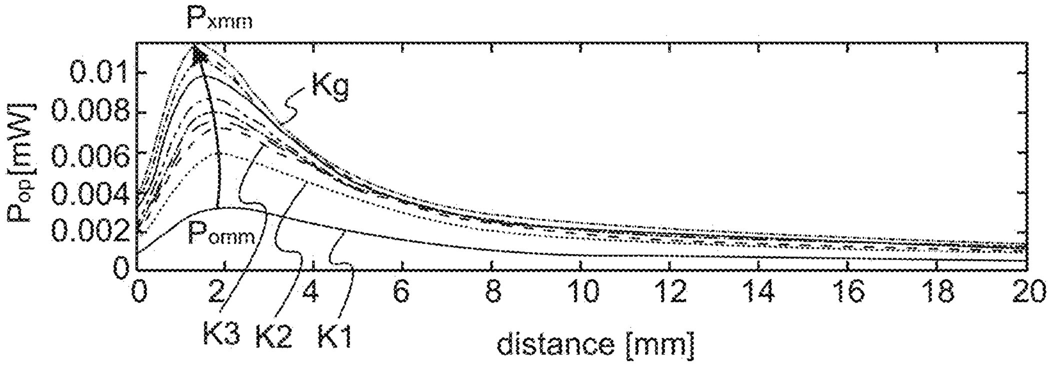
FIG. 6 is a diagram showing the dependence of distance on light intensity for different configurations of the distance between the light emitter unit and the sensor.

FIG. 6 shows a set of curves with several detectors arranged at different distances from the light emitter unit. The curve K1 corresponds to the detector that is closest to the light emitter unit. The curve K9 corresponds to the detected light intensity of a detector located furthest away from the light emitter unit 2.

As shown in FIG. 6, all the curves shown exhibit the typical behavior of a maximum of the detected luminous intensity at a given distance mentioned at the beginning, whereby the detected luminous intensity first decreases non-linearly with increasing distance and then essentially linearly with a small gradient at even greater distances. However, it can also be seen that this maximum is shifted to smaller distances as the distance between the photodetector and the light emitter unit increases. For example, the maximum of curve K1, which is assigned to the detector closest to the light emitter unit, is approximately 2 mm; for curve K9, corresponding to the photodetector furthest away, this maximum is shifted to smaller distances at approximately 1.4 mm.

This shift in the maximum of the detected light intensity allows the distance to the object to be determined precisely by comparing two detected light intensities of photodetectors at different distances.

In the principle proposed here, the light intensity detected by the photodetector and a distance between the light emitter unit and the photodetector are included in the evaluation to determine the distance of the object. This distance corresponds to the path length that the light travels to the object and from the object back to the photodetector. However, it is irrelevant whether the distance sensor has one light emitter unit and several photodetectors or one photodetector and several light emitter units for this purpose. It is only necessary to ensure that different distances or different geometric parameters can be assigned to two or more measurements of the light intensity.

Put simply, the principle proposed here, and in particular the proposed evaluation, is also suitable if the light emitter unit is replaced by a photodetector and the photodetectors are replaced by corresponding light emitter units. The optical path and thus the difference between them remains the same. In this case, it is only necessary to ensure that the signal emitted by the different light emitter units does not hit the photodetector at the same time or at the same wavelength.

Figure 5:
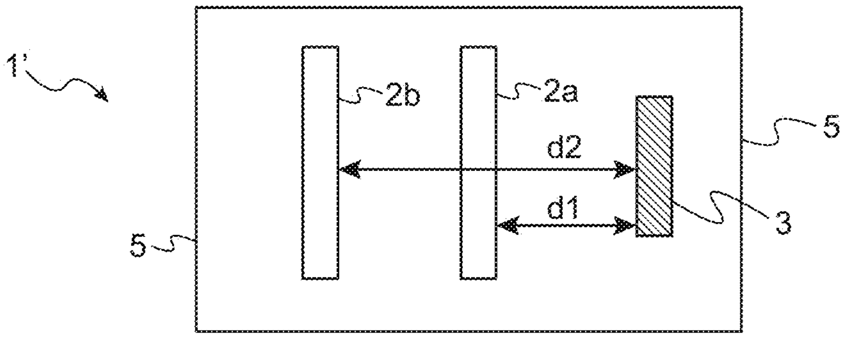
FIG. 5 shows a top view of a fifth embodiment of a distance sensor based on the proposed principle.

FIG. 5 shows an embodiment similar to that in FIG. 3, with the difference that here the light emitter unit has been replaced by a single photodetector and the photodetectors by light emitter units. In particular, this distance sensor 1' comprises a housing with a photodetector 3 arranged on it, from which a first light emitter unit 2*a* and a second light emitter unit 2*b* are located at a greater distance d2. To operate this arrangement, it is now possible, for example, to switch on the first light emitter unit 2*a* at a first point in time and to detect light reflected by the object in the photodetector 3. The light emitter unit 2*a* is then switched off and the light emitter unit 2*b* is activated in order to reactivate the object. The light reflected by the object is received again by the photodetector 3.

The two durations in which the light emitter units 2*a* and 2*b* are active are selected in such a way that the distance of the object to the sensor does not change or changes only insignificantly during the measurement and this has no major impact on the subsequent calculation. This is possible if the pulse duration of the emitted light of the two light emitter units 2*a* and 2*b* are relatively short and follow each other sufficiently closely. In addition, the emitted light should be sufficiently bright so that a sufficiently large signal component of the reflected light is detected in the detector 3. Alternatively, it is possible to select different wavelengths for the light emitter units and then design the detector to detect wavelengthdependent signal components. In this way, for example, a mixed light can be emitted to the object by the two light emitter units; this is reflected there and reaches the detector 3, which splits the mixed light into its components and detects them individually. In principle, this type of detection can also take place in the evaluation circuit.

Figure 8:
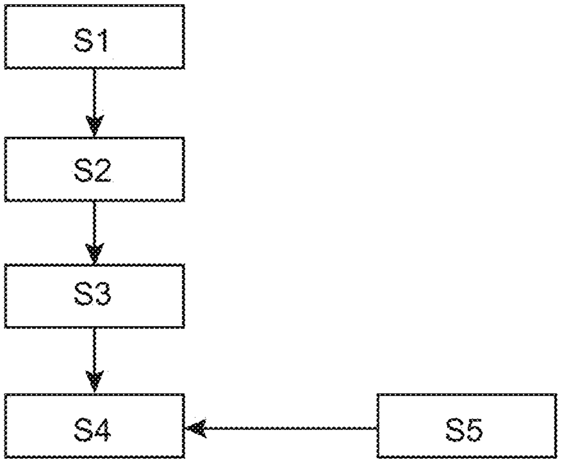
FIG. 8 shows steps of a method for determining a distance of an object with some aspects of the proposed principle.

Finally, FIG. 8 shows an embodiment of a method for determining the distance of an object according to the proposed principle. A dark current and a crosstalk are determined during the process or before the actual measurement and thus the distance determination in step S5. This can be done shortly before the measurement, in particular in a periodic manner, or also during an upstream calibration process. The values determined from this are fed to the evaluation circuit in step S5 for subsequent evaluation.

To carry out the method for determining a distance, the object is now irradiated with a light beam in step S1 so that the light beam is at least partially reflected back from the object.

During irradiation, an intensity of a first light component reflected by the object is detected in step S2. A distance is assigned to the first reflected light component. Similarly, in step S3, an intensity of a second light component reflected by the object is detected, whereby a second distance is also assigned to this second reflected light component. Steps S2 and S3 can be carried out at the same time, so that the detection of the respective light components takes place essentially simultaneously with the irradiation process of the object with a light beam.

Alternatively, it is also possible to provide two light beams in step S1, with the object being irradiated with the first light beam at a point in time and the first light component reflected by the object being detected on this basis, and the object then being irradiated with a second light beam and the intensity of the second light component reflected by the object being detected on this basis.

A key aspect is that the first distance and the second distance are different, resulting in different geometric parameters. In addition, the assigned distances should correspond to a distance between a source generating the light beam and a sensor detecting the light beam.

A distance to the object is then determined in step S4. This is based on the simplified formula mentioned above, in which the sum of the distance squares and a difference of the distance squares are formed, which in turn is weighted with a combination of the signals. These two elements are subtracted from each other, resulting in an overall positive value greater than 0. The square root shown in the formula results from the quadratic decrease in light intensity with increasing distance from the object.

The proposed principle can be used to very accurately measure the distance to an object located in front of a sensor. The proposed measurement and evaluation are also suitable for compensating for the non-linear behavior of the luminous intensity as a function of the distance in such a way that the ambiguities and ambiguity in the detected luminous intensities mentioned at the beginning are resolved. This creates a distance sensor that can determine the distance to an object over a wide range by evaluating the light intensity.

REFERENCE LIST

1 Distance sensor
2 Light emitter unit
2*a*, 2*b* Light emitter unit
3 Detector
3*a*, 3*b* Detector
3*c*, 3*d* Detector
5 Housing
6 Housing inner area
10 Emitter area
20 Detector area
25, 25' Connection areas
30*a*, 30*b* Center
40 Virtual circle
41 Center

The invention claimed is:

1. Distance sensor for detecting an object in a detection range of the distance sensor, comprising:
- a sensor housing with a plurality of connection areas;
- at least one light emitter unit for generating light of at least a first wavelength;
- at least one first detector for receiving a light signal and generating a signal corresponding to the light intensity, wherein the first detector is arranged at a first distance from the light emitter unit,
- at least one second detector for receiving a light signal and generating a signal corresponding to the light intensity, wherein the second detector is arranged at a second distance from the light emitter unit;
- an evaluation circuit which is connected to the first and second detector and is configured to determine a distance to an object positioned in the detection range of the distance sensor from the signals and the first and second distance, wherein the evaluation circuit is configured to determine the distance from a sum of the distance squares and a weighted combination of the signals corresponding to the detected light intensities in conjunction with a difference of the distance squares.

2. Distance sensor for detecting an object in a detection range of the distance sensor, comprising:
- a sensor housing with a plurality of connection areas;
- at least one detector for receiving a light signal and generating a signal corresponding to the light intensity;
- a first light emitter unit for generating light of at least a first wavelength, which is arranged at a first distance from the detector,
- a second light emitter unit for generating light of at least a second wavelength, which is arranged at a second distance from the detector;
- an evaluation circuit which is connected to the detector and is configured to determine a distance to an object positioned in the detection range of the distance sensor from signals corresponding to detected light intensities and the first and second distance, wherein the evaluation circuit is configured to determine the distance from a sum of the distance squares and a weighted combination of the signals corresponding to the detected light intensities in conjunction with a difference of the distance squares.

3. The distance sensor according to claim 1,
- characterized in that first and second detector are arranged at different distances from the light emitter unit or first and second light emitter unit are arranged at different distances from the detector substantially in the same direction.

4. The distance sensor according to claim 1, wherein a virtual line between the first detector and the light emitter unit and a virtual line between the second detector and the light emitter unit include an angle which is not equal to a multiple of 90°; or wherein a virtual line between the detector and the first light emitter unit and a virtual line between the detector and the second light emitter unit include an angle which is not equal to a multiple of 90°.

5. The distance sensor according to claim 1, wherein the first detector and the second detector do not lie on a virtual circle with a center point at the position of the light emitter unit; or wherein the first light emitter unit and the second light emitter unit do not lie on a virtual circle with a center point at the position of the detector.

6. The distance sensor according to claim 1, wherein a virtual line between the two detectors is not intersected by a perpendicular line passing through the light emitter unit with an intersection point bisecting the virtual line.

7. The distance sensor according to claim 2 wherein a virtual line between the two light emitter units is not intersected by a perpendicular line passing through the detector with an intersection point bisecting the virtual line.

8. The distance sensor according to claim 1, wherein the light emitter unit is configured to generate a first light beam and to generate a second light beam, wherein the first detector is configured to detect the first light beam and the second detector is configured to detect the second light beam.

9. The distance sensor according to claim 1, wherein the first light emitter unit is configured to generate a first light beam and the second light emitter unit is configured to generate a second light beam, wherein the detector is configured to detect the first and second light beam.

10. The distance sensor according to claim 8, wherein the first light beam and the second light beam differ in at least one of the following properties:

a central wavelength;

a point in time when the respective light beam is emitted;

a pulse duration.

11. The distance sensor according to claim 1, further comprising an optical barrier arranged between the light emitter unit of units and the detectors or the detector.

12. The distance sensor according to claim 1, wherein the evaluation circuit is configured to control the first detector and second detector at different times; or wherein the evaluation circuit is configured to control the first and second light emitter unit at different times.

13. The distance sensor according to claim 1, wherein the connection areas are arranged at least partially around the first and second detector and the light emitter unit.

14. The distance sensor according to claim 1, wherein the evaluation circuit is configured to conduct a dark current measurement when the light emitter unit or when the first and second light emitter unit are deactivated.

15. The distance sensor according to claim 1, wherein the evaluation circuit is configured to take into account a value corresponding to a crosstalk of light from the light emitter unit(s) to the detector when calculating the weighted combination.

16. The distance sensor according to claim 1, wherein the evaluation circuit comprises a memory in which parameters are stored which correspond in particular to the first and second distance.

17. A method for determining a distance of an object, comprising the steps of:

Irradiating the object with a beam of light, which reflects the light beam;

Detecting an intensity of a first light component reflected by the object, wherein a first distance is assigned to the first reflected light component;

Detecting an intensity of a second light component reflected by the object, wherein a second distance is assigned to the second reflected light component;

wherein the first distance and the second distance are different and correspond to a distance between a source generating the light beam and a sensor detecting the respective light portion;

Determining a distance to the object based on a sum of the distance squares and a weighted combination of the signals corresponding to the detected intensities in conjunction with a difference of the distance squares.

18. The method according to claim 17, further comprising:

Detecting a dark current when the object is not irradiated; wherein the step of determining the distance comprises compensating the dark current in the signals corresponding to the detected intensities.

19. The method according to claim 18, further comprising:

Determining a crosstalk resulting from an intensity of a detected light component when a light beam is emitted without being reflected by an object.

* * * * *